United States Patent
Sielski et al.

(10) Patent No.: US 10,382,726 B2
(45) Date of Patent: *Aug. 13, 2019

(54) METHOD AND APPARATUS FOR FORWARDING IMAGES

(71) Applicant: MOTOROLA SOLUTIONS, INC, Chicago, IL (US)

(72) Inventors: Marcin Lech Sielski, Cracow (PL); Mariusz R. Wawrowski, Wawrzenczyce (PL)

(73) Assignee: MOTOROLA SOLUTIONS, INC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/753,346

(22) PCT Filed: Oct. 12, 2015

(86) PCT No.: PCT/PL2015/050054
§ 371 (c)(1),
(2) Date: Feb. 19, 2018

(87) PCT Pub. No.: WO2017/065624
PCT Pub. Date: Apr. 20, 2017

(65) Prior Publication Data
US 2018/0249127 A1    Aug. 30, 2018

(51) Int. Cl.
*H04N 7/18* (2006.01)
*G08G 1/00* (2006.01)
(Continued)

(52) U.S. Cl.
CPC ............. *H04N 7/181* (2013.01); *B60R 1/00* (2013.01); *G08G 1/20* (2013.01); *H04N 5/232* (2013.01);
(Continued)

(58) Field of Classification Search
CPC combination set(s) only.
See application file for complete search history.

(56) References Cited

U.S. PATENT DOCUMENTS 8,762,053 B1    6/2014  Lehman
9,466,212 B1 * 10/2016  Stumphauzer, II .... G08G 1/137
(Continued)

FOREIGN PATENT DOCUMENTS

CN          102263933           4/2013
EP          2078928 A1          7/2009
(Continued)

OTHER PUBLICATIONS

The International Search Report and the Written Opinion, corresponding patent application No. PCT/PL2015/050054 filed Oct. 12, 2015, all pages.

*Primary Examiner* — Janese Duley

(57) ABSTRACT

A method and apparatus for providing images on a camera is provided herein. During operation a server will utilize a vehicle's speed and direction. Images from cameras will then be provided to the vehicle/user based on the vehicle speed and direction. In addition, cameras will have their pan/tilt/zoom (PTZ) adjusted based on the vehicle speed and direction of travel in order to eliminate/prevent overlapping the area that is surveyed by a moving observer.

8 Claims, 10 Drawing Sheets

(51) Int. Cl.
  *H04N 5/232* (2006.01)
  *B60R 1/00* (2006.01)
  *H04N 5/247* (2006.01)

(52) U.S. Cl.
  CPC ..... *H04N 5/23203* (2013.01); *H04N 5/23296* (2013.01); *H04N 5/23299* (2018.08); *H04N 5/247* (2013.01); *B60R 2300/10* (2013.01); *B60R 2300/207* (2013.01); *B60R 2300/302* (2013.01)

(56) References Cited

U.S. PATENT DOCUMENTS

| | | |
|---|---|---|
| 2006/0203090 A1 | 9/2006 | Wang et al. |
| 2010/0201829 A1* | 8/2010 | Skoskiewicz ............ G08G 1/04 348/211.2 |
| 2013/0010144 A1 | 1/2013 | Park |
| 2015/0274073 A1 | 10/2015 | Modi et al. |

FOREIGN PATENT DOCUMENTS

| | | |
|---|---|---|
| EP | 2325820 A1 | 5/2011 |
| WO | 2008070687 A2 | 6/2008 |

\* cited by examiner

METHOD AND APPARATUS FOR FORWARDING IMAGES

FIELD OF THE INVENTION

The present invention generally relates to forwarding images to a user, and more particularly to a method and apparatus for forwarding images from cameras (such as a camera video stream), based on a speed and direction of the user.

BACKGROUND OF THE INVENTION

In many public-safety applications, video streams from multiple surveillance systems may be provided to public-safety officer's vehicles. In most cases, the video stream is manually chosen by the officer. It is often an inconvenience for an officer in a moving vehicle to choose a relevant video stream from multiple cameras. For example, a video stream from a camera may continue to be provided to the officer after the vehicle has left the vicinity of the camera, requiring the officer to manually change to a more-relevant video stream.

It would be beneficial if an automated technique could be utilized for providing images from cameras (such as relevant video streams from images from cameras) to an individual in a moving vehicle, without requiring the driver's attention to do so. Therefore, a need exists for a method and apparatus for autonomously providing images from cameras (such as a camera video stream) to a moving vehicle, yet does not require the driver's attention to choose the appropriate images.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
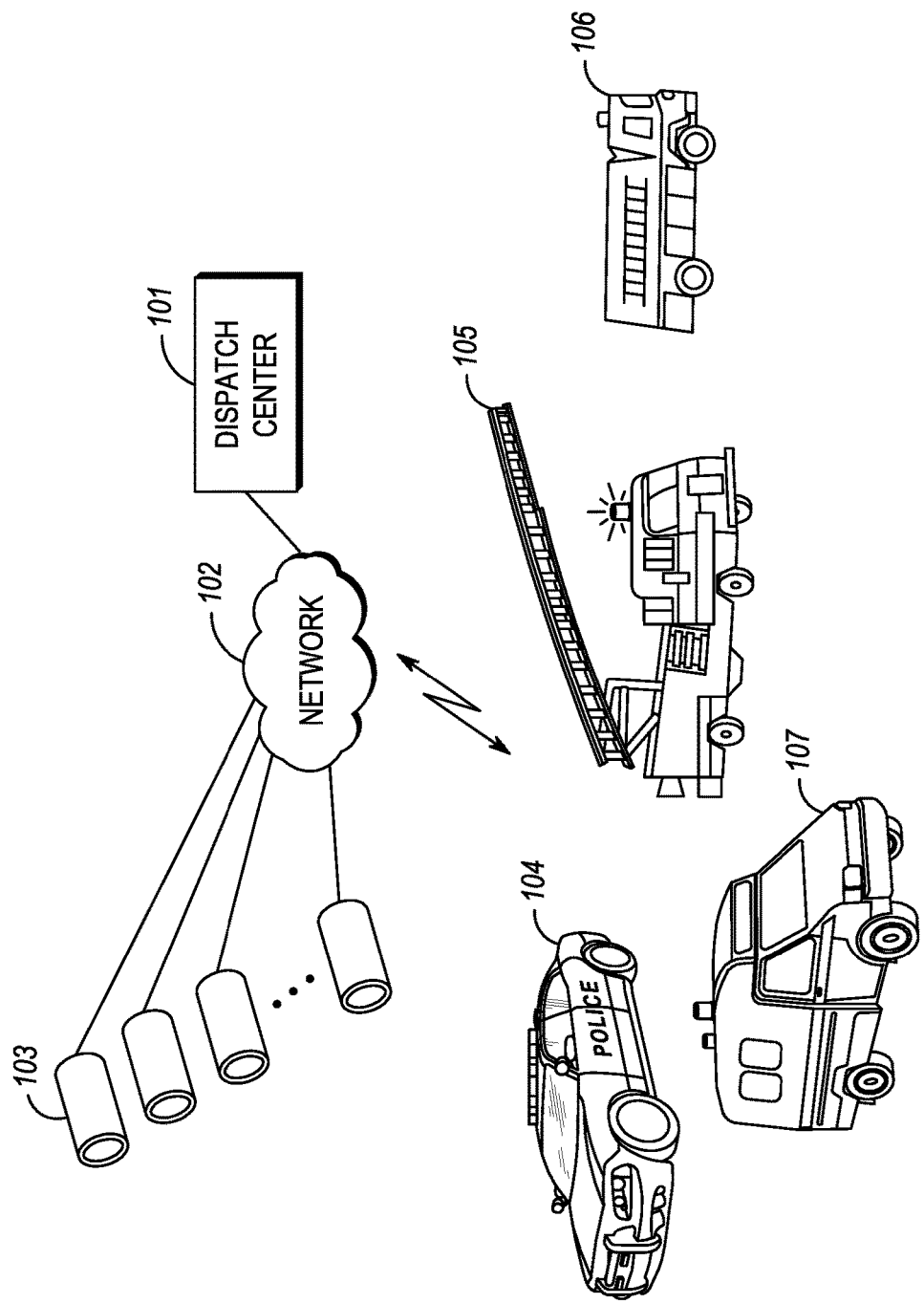
FIG. 1 illustrates an operational environment for utilizing the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for providing images from cameras are provided herein. During operation a server will utilize a vehicle's speed and direction. Images from cameras will then be provided to the vehicle/user based on the vehicle speed and direction. In addition, cameras will have their pan/tilt/zoom (PTZ) adjusted based on the vehicle speed and direction of travel in order to eliminate/prevent overlapping the area that is surveyed by a moving observer.

As an example of the above, if a vehicle is moving at 60 miles per hour, occupants of the vehicle will probably be more interested in images on/from images from cameras in front of them than from behind them. With this in mind, a two-dimensional or three dimensional figure, shape, or region can be overlaid onto a geographic area. (The "region" may comprise an area within a certain distance from the vehicle). Images from cameras that lie within the figure, shape, or region may be provided to the user. These images from cameras may be prioritized, with the closest camera to the vehicle (and within the figure, shape, or region) having a highest priority. Images on highest priority images from cameras will be provided to the vehicle/user before lower priority images from cameras. Cameras providing images will have their PTZ adjusted so that they monitor areas with a higher probability of not being monitored by persons within the moving vehicle.

It should be noted that with the above scheme of providing images, it is not necessary that images from the closest camera be provided to the user/vehicle. If a camera is outside the figure, shape, or region, images from that camera will not be provided. For example, consider a vehicle moving at a high rate of speed down an interstate. An occupant of the vehicle is interested in images from video cameras within near them. The figure, shape, or region may comprise an area some distance in front of the vehicle. Thus, images from those cameras behind the vehicle or immediately in front of the vehicle will not be provided to the user. In addition, the cameras providing images will have their PTZ adjusted based on the vehicles speed and direction of travel.

FIG. 1 is a block diagram showing a general operational environment, according to one embodiment of the present invention. In this particular illustration the functionality of a server is placed within dispatch center 101. As shown in FIG. 1 a plurality of public-safety vehicles 104-107 are in communication with dispatch center 101 (serving as server 101) through intervening network 102. Public-safety vehicles 104-107 may comprise such vehicles as rescue vehicles, ladder trucks, ambulances, police vehicles, fire engines, automobiles, motorcycles, . . . , etc. Network 102 may comprise one of any number of over-the-air or wired networks. For example network 102 may comprise a private 802.11 network set up by a building operator, a next-generation cellular communications network operated by a cellular service provider, or any public-safety network such as an APCO 25 network or the FirstNet broadband network.

As shown in FIG. 1, cameras 103 are provided. In this particular embodiment, cameras 103 comprise cameras that may have their PTZ adjusted by server 101. In one embodiment, the selected field of view within the camera's overall viewshed is obtained via automated manipulation of Pan, Tilt, and Zoom (PTZ) motors attached to the camera. In an alternate embodiment of the present invention, the selected field of view within the camera's overall viewshed is obtained via automated, digital manipulation of a captured fixed field of view. In such embodiments, the camera is typically configured with a high resolution, wide angle lens and a high definition sensor. The camera then applies post processing techniques to digitally pan, tilt, and zoom a dynamically selected, narrow field of view (also known as a region of interest) within the fixed, captured, wide angle field of view. In yet another embodiment of the present invention, part of the PTZ tour is the ability for the camera to move its geographic location (like a camera on a moveable track or mounted in an unmanned aerial vehicle) in order to see a new field of view. In all cases, a camera may continually move its field of view, or rotate through a predefined series of fields of view, remaining at each field of view for a predetermined amount of time.

In this particular embodiment, cameras 103 provide video images to dispatch center 101 through intervening network 102. More particularly, cameras 103 electronically capture a sequence of video frames (i.e., a sequence of one or more still images), with optional accompanying audio, in a digital format. These video frames are sent from camera 103 to dispatch center 101 through network 102. Along with video frames, a camera ID, a camera location, and a camera's field of view (or view direction) is also provided to server 101.

Dispatch center 101, serving as a server, determines images from cameras for a particular vehicle, and streams video from the camera to vehicles 104-107. Dispatch center 101 also commands cameras to point in a particular direction based on the vehicles direction of travel. It should be noted that video from different cameras may be simultaneously streamed to different vehicles. For example, vehicle 104 may receive video from a first camera, while vehicles 105 receives video from a second camera. Additionally, multiple vehicles may receive the same video from a same camera. It should be further noted that the server may not automatically start streaming video without intervention or acceptance from the user operating the vehicle.

Figure 2:
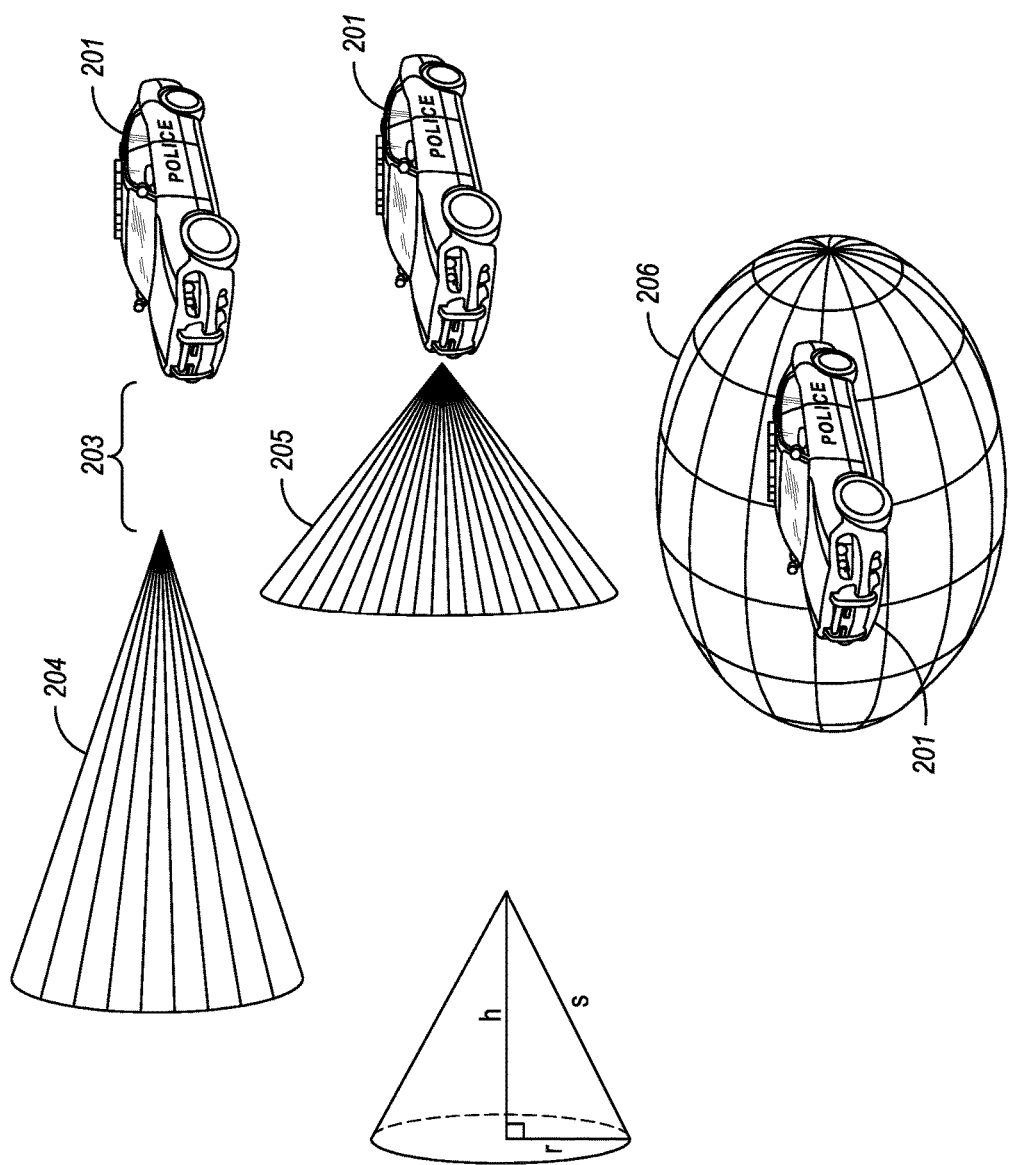
FIG. 2 illustrates a changing geometric shape based on speed and direction of travel.

FIG. 2 illustrates a changing figure, shape, or region based on speed and direction of travel. In this particular embodiment a cone is utilized as the figure, shape, or region for example purposes only. One of ordinary skill in the art will recognize that any two-dimensional or three-dimensional figure, shape, or region may be utilized as described. In FIG. 2, when vehicle 201 is traveling at a high rate of speed (a first speed), all cameras within cone 204 will be identified to provide images. For example, all cameras 103 lying within cone 204 will be identified by server 101. Server 101 will then provide vehicle 201 images from a closest camera within the cone. It should be noted that cone 204 is not necessarily drawn to scale. Cone 204 may have a height and radius on the order of several miles in length.

As vehicle 201 slows down, the figure, shape, or region will change shape. This is shown in FIG. 2 as cone 204 changing shape to cone 205. In this particular embodiment, the height and radius of cone 204 will change as the speed of vehicle 201 changes, with the height of the cone pointed in the direction of travel. In this particular embodiment, the radius of cone 204 increases with decreasing vehicle speed while the height of cone 204 decreases with decreasing vehicle speed. This is illustrated as cone 205. As is evident, when vehicle 201 slows down, the figure, shape, or region used to determine images from cameras changes shape from a first shape to a second shape.

It should be noted that the same figure or shape need not be used for all speeds. As illustrated in FIG. 2, when vehicle 201 is stopped (or moving at a speed below a threshold), spheroid 206 may be utilized as the shape used to determine images from cameras. Thus, when vehicle 201 is stopped, all cameras within spheroid 206 are identified. Again, spheroid 206 is not necessarily drawn to scale, and may have radiuses on the order of miles in length.

It should also be noted that the figure, shape, or region utilized for determining images from cameras may be geographically located a predetermined distance 203 from vehicle 201. This distance may also change, depending upon the speed of vehicle 201. So, for example, when traveling at a higher rate of speed, cone 204 begins a greater distance 203 (e.g., a mile) from vehicle 201 than when travelling at a lower speed. Distance 203 decreases as speed of vehicle 201 decreases, reaching zero as the vehicle slows below a predetermined threshold.

Figure 3:
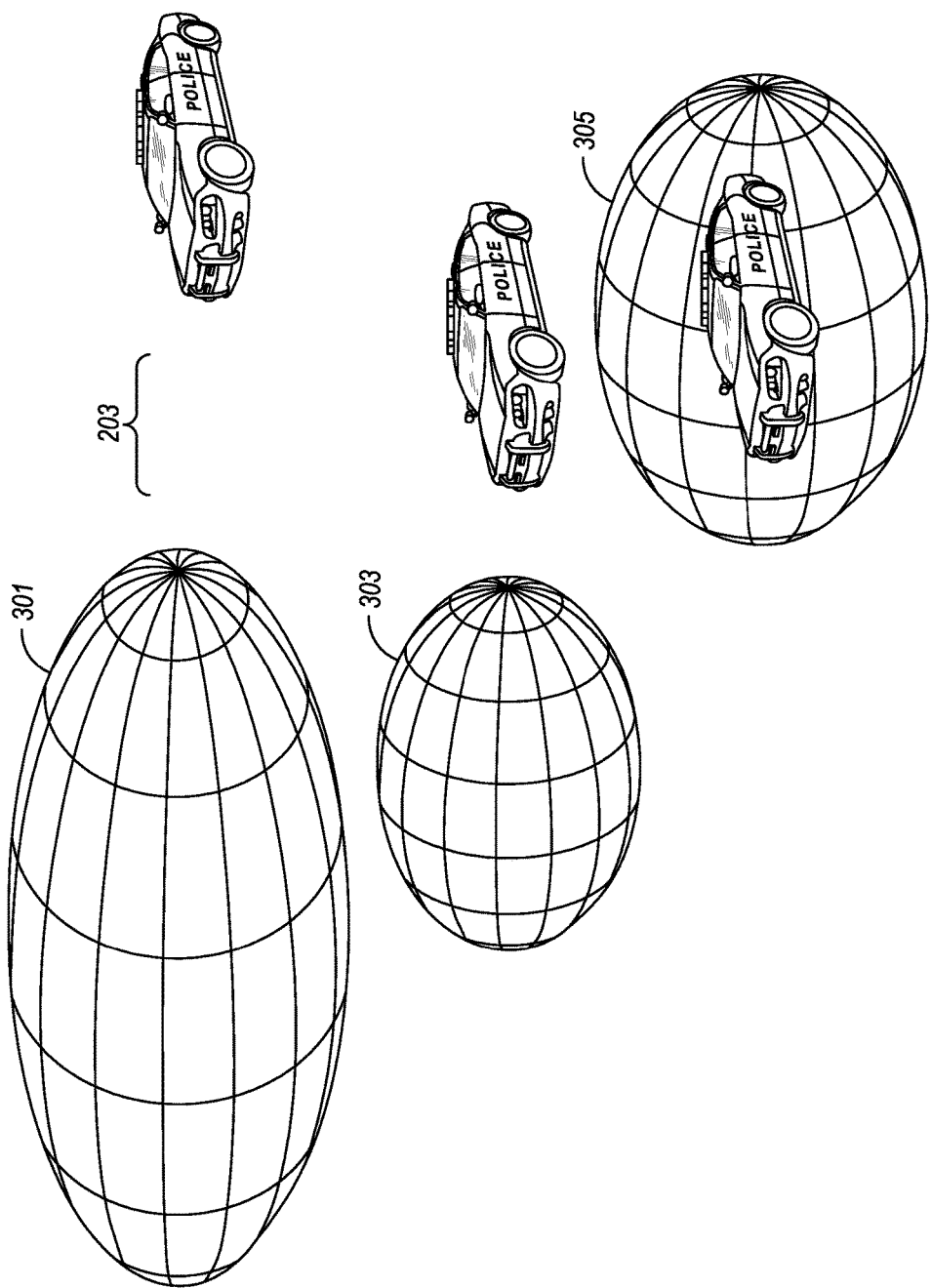
FIG. 3 illustrates a changing geometric shape based on speed and direction of travel.

FIG. 3 illustrates a changing geometric shape based on speed and direction of travel. Unlike the cone utilized in FIG. 2, FIG. 3 utilizes a spheroid. As mentioned above, spheroids 301-305 are not necessarily drawn to scale. Server 101 will identify cameras within the spheroid as potential images from cameras. The spheroid begins a predetermined distance 203 from the vehicle (again, not drawn to scale). This distance is based upon the speed of the vehicle. As with FIG. 2, the spheroid changes shape and size based on the speed of the vehicle. As shown, spheroids 301, 303, and 305 all have differing axis values based on vehicle speed, with an axis pointing in a direction of travel.

Figure 4:
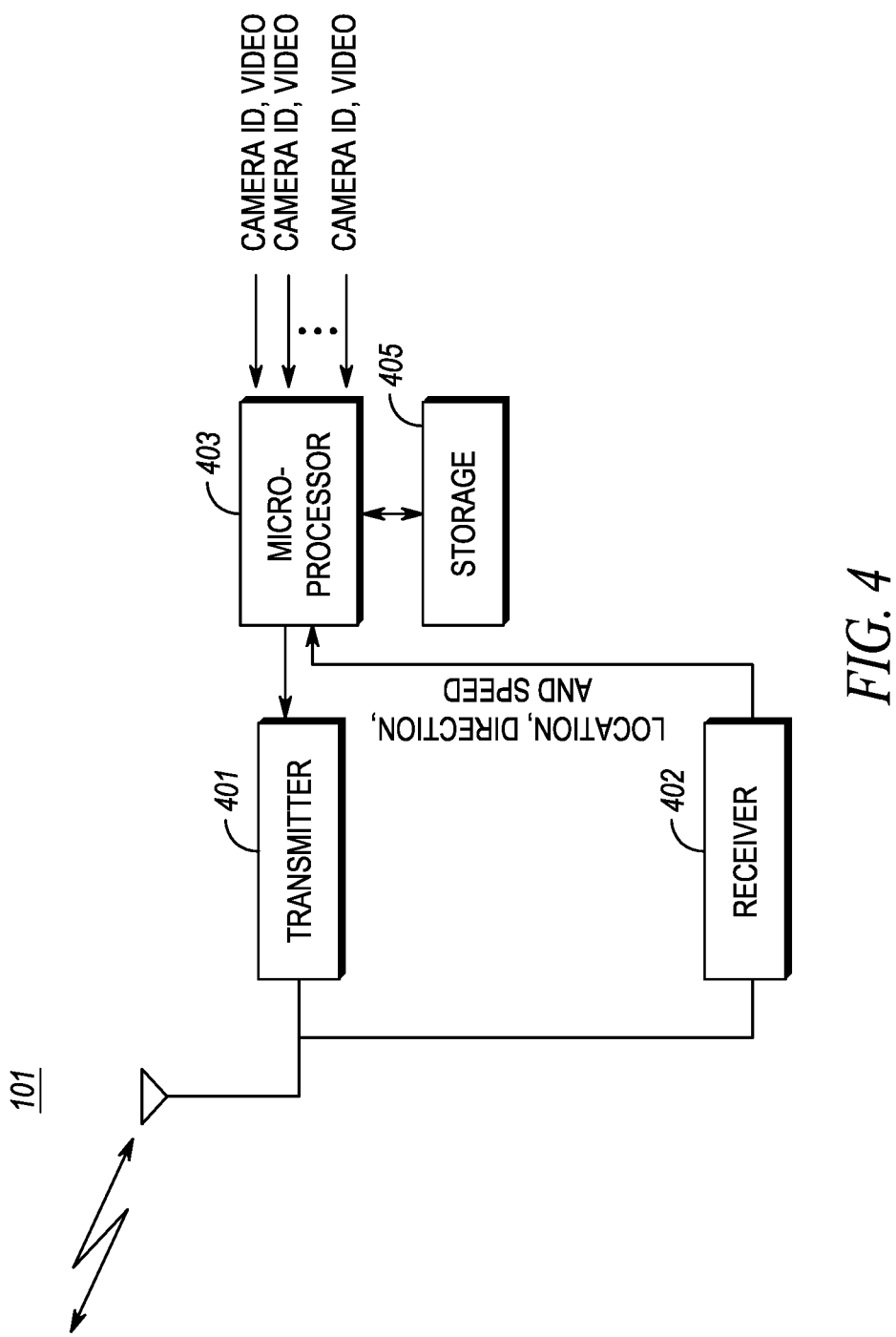
FIG. 4 is a block diagram of the dispatch center of FIG. 1.

FIG. 4 is a block diagram of dispatch center 101 (or server 101) of FIG. 1. As shown, server 101 comprises microprocessor 403 that is communicatively coupled with various system components, including transmitter 401, receiver 402, and general storage component 405. Other components may be present, but not shown. Microprocessor 403, serving as logic circuitry 403, comprises a digital signal processor (DSP), general purpose microprocessor, a programmable logic device, or application specific integrated circuit (ASIC) and is utilized/configured to determine a figure, shape, or region based on vehicle speed, determine images from cameras within the figure, shape, or region, and provide images from cameras within the figure, shape, or region. Logic circuitry 403 is also configured to determine and adjust a PTZ of a camera based on a vehicles direction of travel.

Storage 405 comprises standard random access memory and is used to store images related to images from cameras along with a geographic map of a region. More particularly, storage 405 may comprise an area-wide map of a city and its surroundings. Potential images from cameras may be identified on the map. For example, storage 405 may comprise an area-wide map of Chicago with locations for all cameras superimposed on the map.

Transmitter 401 and receiver 402 are common circuitry known in the art for communication utilizing a well known communication protocol, and serve as means for transmitting and receiving data. Examples of well known communication protocols include LTE, TETRA/TEDS, and 802.11.

During operation receiver 402 will receive a location, direction, and speed of a vehicle. In an alternate embodiment, route images may also be received. Route images may indicate future turns/streets for the vehicle. As is commonly known in the art, modern CAD systems generate a route for vehicles. Location and speed information may be provided to receiver 402 as part of a fleet-management protocol, or periodically from location-finding equipment (not shown) located within the vehicle. Once received, the information will be provided to logic circuitry 403. Logic circuitry will then determine a figure, shape, or region based on the location, direction, and speed of the vehicle. Logic circuitry 403 will then retrieve a map from storage 405 and overlay the shape/figure on the map at substantially the location of the vehicle. All cameras within the shape/figure will then be identified by logic circuitry 403. A video stream from a camera is then transmitted (or relayed) to the vehicle by transmitter 401. The video stream chosen is preferably the closest camera to the vehicle. Multiple video streams may be simultaneously relayed.

In addition to choosing a camera to provide images to a vehicle, logic circuitry 403 is also configured to determine a PTZ for the chosen camera(s) so that images received from those cameras does not overlap with a person's view within the vehicle.

Thus, as described, the apparatus shown in FIG. 4 provides a receiver outputting a direction of travel and location of a vehicle to logic circuitry. The receiver, receiving this information from the vehicle. Logic circuitry has the direction of travel and the location as an input and outputs instructions to cameras (via a transmitter) within a figure, shape, or region, wherein the instructions are used to instruct the cameras within the figure, shape, or region to point in a direction that is determined based on the direction of travel of the vehicle.

The figure, shape, or region has a shape that changes with vehicle speed and the cameras preferably exist outside the vehicle, and are not attached to the vehicle.

Figure 5:
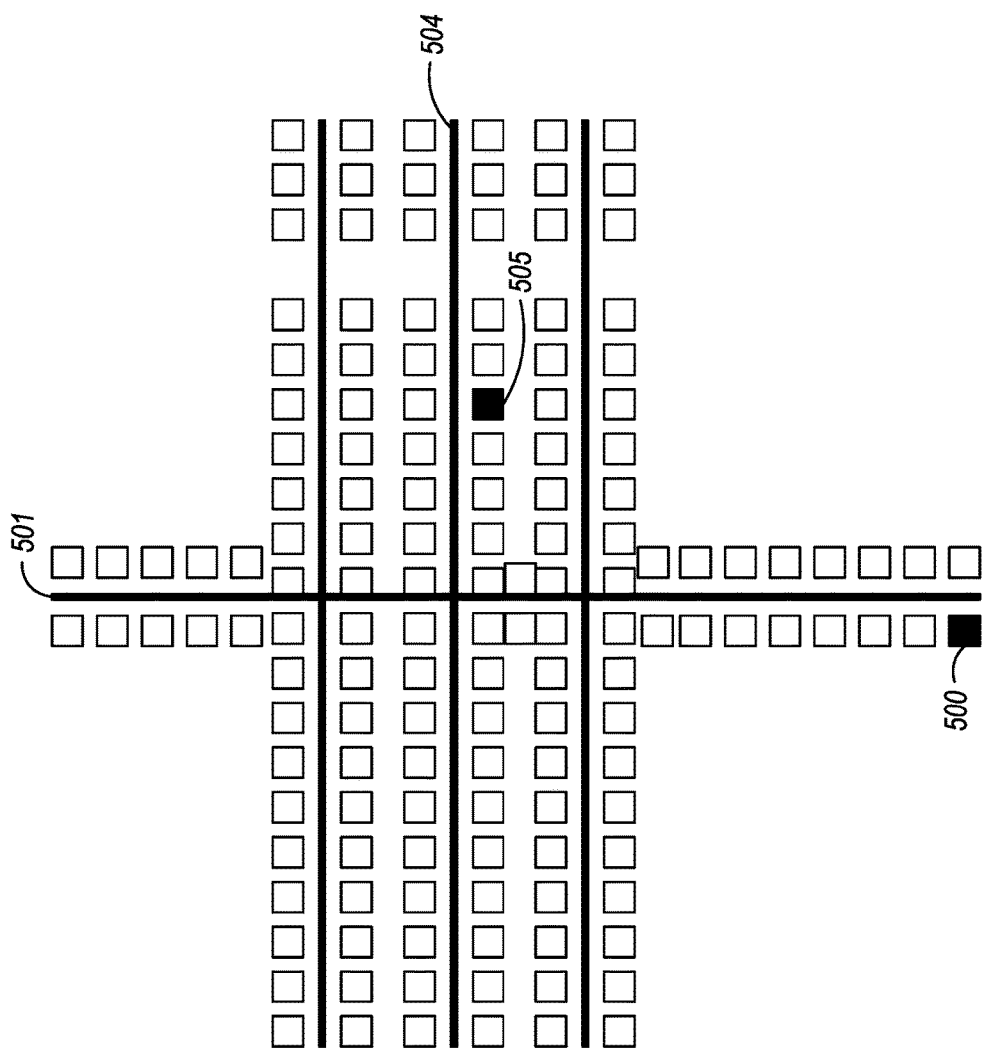
FIG. 5 through FIG. 8 illustrate a geographic area as a vehicle travels from point to point.

With reference to FIG. 5, assume that a vehicle is located near building 500 and will be traveling to building 505 via streets 501 and 504. Building 500 may comprise the location of, for example, a police station. Dispatch center 101 will receive video streams from cameras (not shown) within the geographic region shown in FIG. 5. In response, dispatch center 101 will receive a speed of the vehicle (preferably from the vehicle itself), receive a direction of travel for the vehicle (preferably from the vehicle itself), and receive a location of the vehicle (preferably from the vehicle itself). Dispatch center 101 will then determine a figure, shape, or region based on the speed and direction of travel. A distance 203 from the vehicle may also be determined based on the speed. Dispatch center 101 will then overlay the shape/figure on the map at the appropriate location. This is illustrated in FIG. 6, with a cone being used as the figure, shape, or region.

Figure 6:
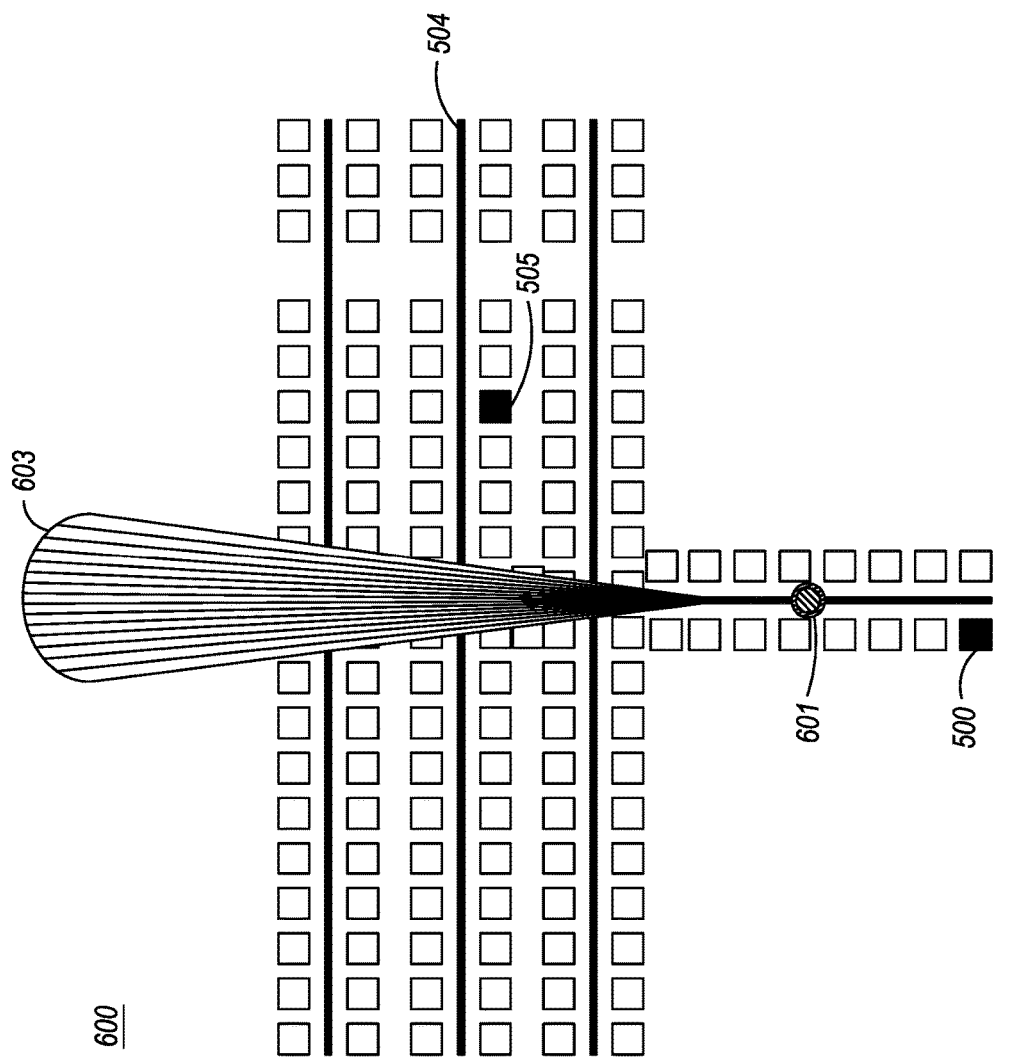

As shown in FIG. 6, the vehicle is located at point 601. Cone 603 is overlaid onto map 600. Dispatch center 101 will then determine all cameras lying within cone 603. These will be tagged as images from cameras by dispatch center 101. An appropriate video stream will then be provided or made available to the vehicle.

Figure 7:
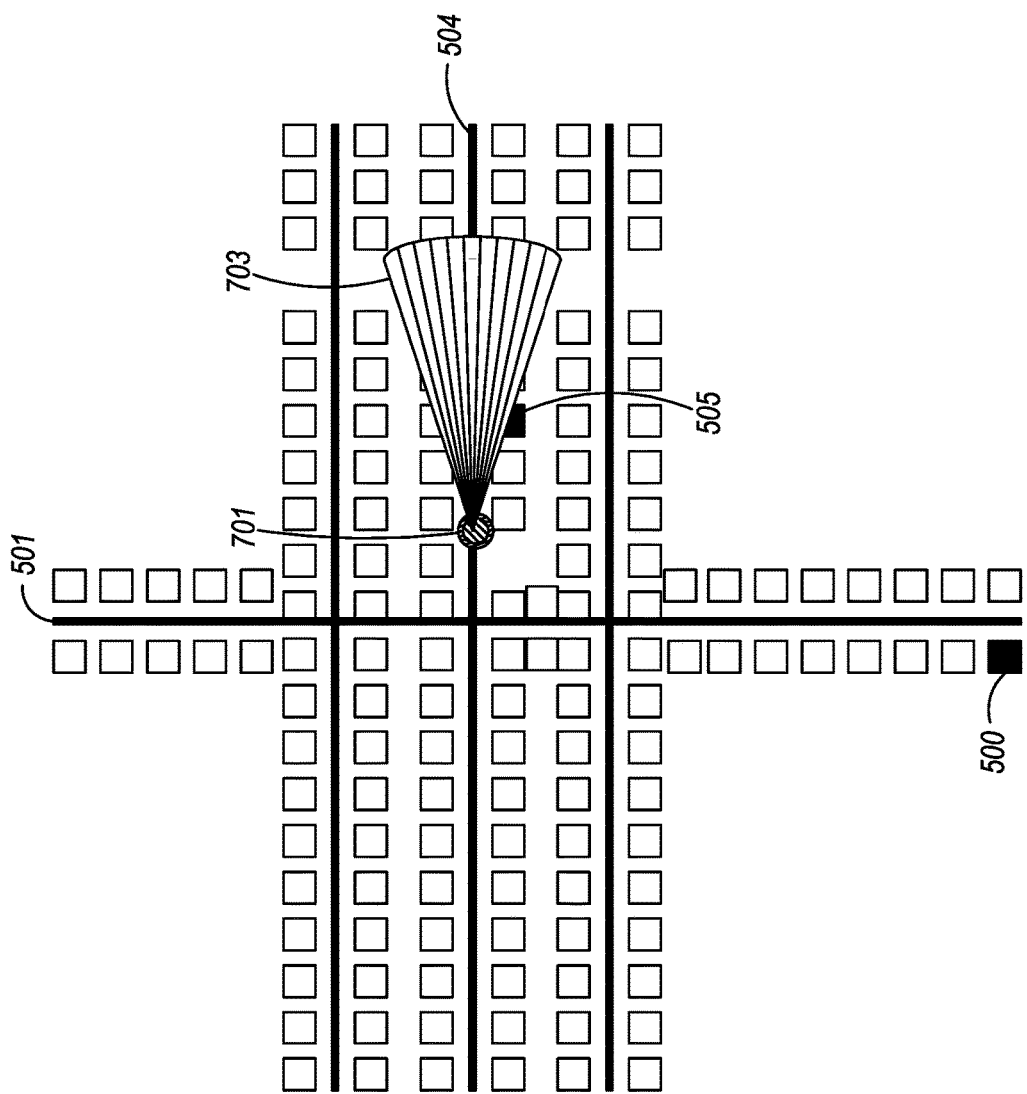
Figure 8:
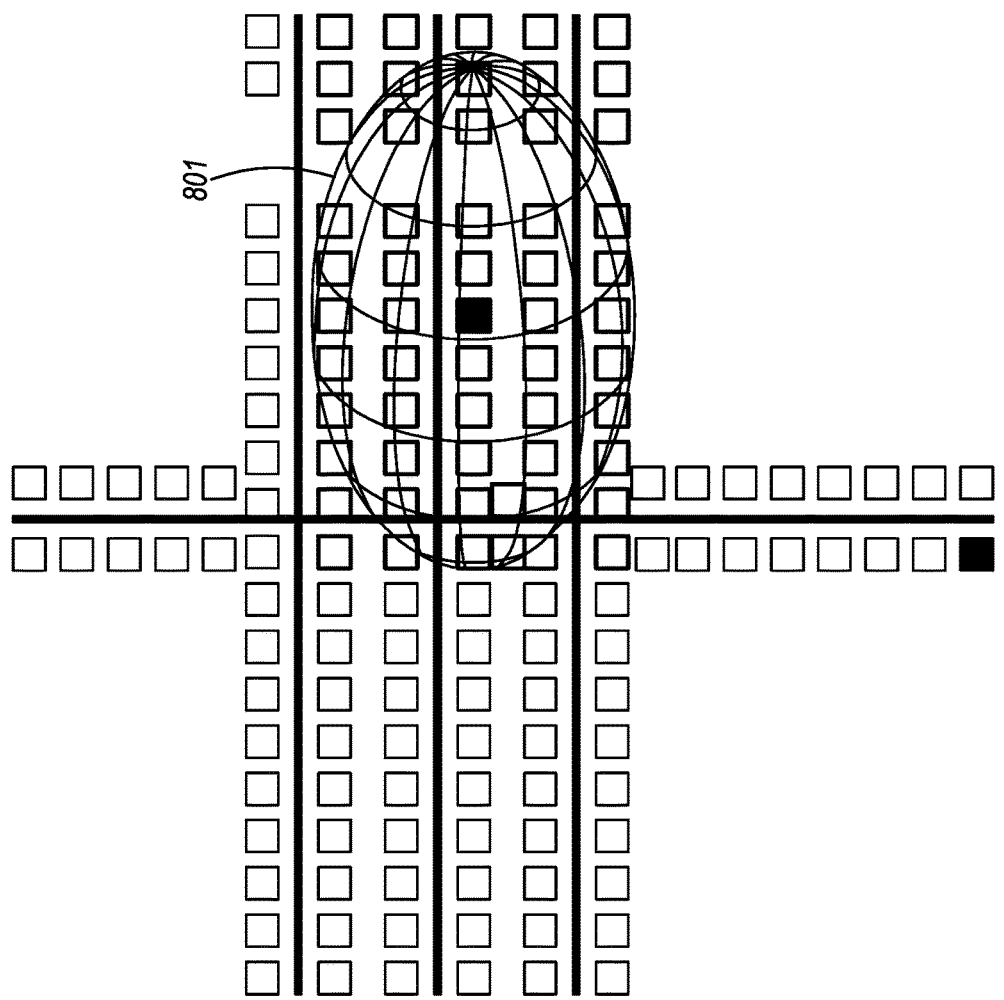

As the vehicle changes speed and location, cone 603 may morph into various shapes and sizes. This is illustrated in FIG. 7. As vehicle has moved to location 701 and reduces its speed, shape 603 has morphed into shape 703. Dispatch center 101 will then determine all cameras lying within cone 703. These will be tagged as images from cameras by dispatch center 101. When the vehicle stops (or reduces speed to below a threshold), the figure, shape, or region may change from one geometric shape to another. This is illustrated in FIG. 8, with spheroid 801 replacing cones 603 and 703.

As discussed above, the figure, shape, or region may comprise a two-dimensional shape. As the vehicle moves along, the two-dimensional shape should be covering images from cameras falling within a certain angle around the line of motion (coverage angle, x°). If x=360° (which would be the default configuration), then an entire circle around the vehicle is covered. However, preferably this angle would narrow as speed increases so that upcoming cameras would be given higher priority over passed cameras. So, for example, at 50 miles per hour, x=60°. The vehicle will be sent images from cameras that cover a narrow forward-looking 60° sector from the vehicle's current location. (Forward looking direction is calculated based on line of motion and velocity vector of vehicle movement).

As discussed above, the "range" of the shape may change with speed so as the vehicle moves along, images from cameras should fall within a certain range from the vehicle. The range increases with speed.

As discussed above, in a particular embodiment, only images on one camera is provided to the vehicle. More particularly, a video stream from a single camera is provided to the vehicle. In a first embodiment, the video stream is from a closest camera. It should be noted, however, that images from multiple cameras may be provided to the vehicle simultaneously. So, for example, if the vehicle comprises multiple video-displays, feeds from multiple cameras may be provided to the vehicle.

As is evident, as a vehicle moves about a geographic area and changes its direction and speed, images on different images from cameras will be provided to the vehicle. In order to prevent the images from changing too quickly, a limit on how quickly images can change may be utilized. For example, a minimal time during which current camera must play a video stream after a camera leaves the area may be set. Hold-off time is preferably configurable by user, but the server may decide the hold-off time automatically.

In one particular embodiment two videos streams are provided; one is always 'dynamic' (changing as described above), while the other may 'hold' for some time. In an alternate embodiment, the two video feeds may be provided based on images from cameras that lie within two, differing geometric figure, shape, or regions. For example, a first feed may be provided that chooses cameras from a first geometric figure, shape, or region, while a second feed may be provided that shows cameras from a second figure, shape, or region. For example, one stream shows what is 1 mile in front of the vehicle, while the other shows what is 5 feet in front of the vehicle.

Figure 9:
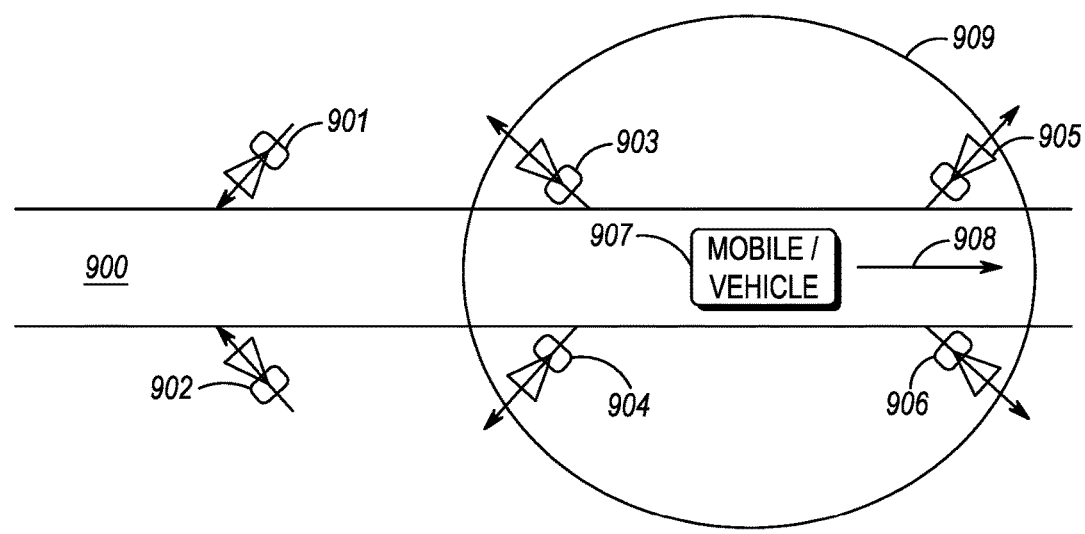
FIG. 9 illustrates a changing geometric shape based on anticipated route of travel.

FIG. 9 illustrates changing a camera's PTZ based on a direction of travel of an object. As shown, vehicle 907 is traveling down road 900 in a direction of travel indicated by vector 908. Cameras 901-906 lie along road 900. As discussed above, only cameras within region 909 will be provided to vehicle 907. As is evident, cameras 903-906 lie within region 909 and may have their images provided to vehicle 907. Cameras 903-906 are also adjusted to point in a direction that is away from the direction of motion 908. This is accomplished as described in FIG. 10.

During operation, logic circuitry will obtain a location for all cameras within a geographic area (as discussed above). Logic circuitry 403 will then place vehicle 907 at an origin of a graph, with direction of travel 908 lying along the x axis. Those cameras within quadrant I will have their PTZ adjusted to point in a direction that captures objects within quadrant I, those cameras within quadrant II will have their PTZ adjusted to point in a direction that captures objects within quadrant II, those cameras within quadrant III will have their PTZ adjusted to point in a direction that captures objects within quadrant III, those cameras within quadrant IV will have their PTZ adjusted to point in a direction that captures objects within quadrant IV.

As an example, those cameras that lie in quadrant I may have their PTZ adjusted so that the camera points in a direction that is 45 degrees from the direction of travel 908, those cameras that lie in quadrant II may have their PTZ adjusted so that the camera points in a direction that is 135 degrees from the direction of travel 908, those cameras that lie in quadrant III will have their PTZ adjusted so that the camera points in a direction that is 225 degrees from the direction of travel 908, and those cameras that lie in quadrant I may have their PTZ adjusted so that the camera points in a direction that is 315 degrees from the direction of travel 908.

Figure 10:
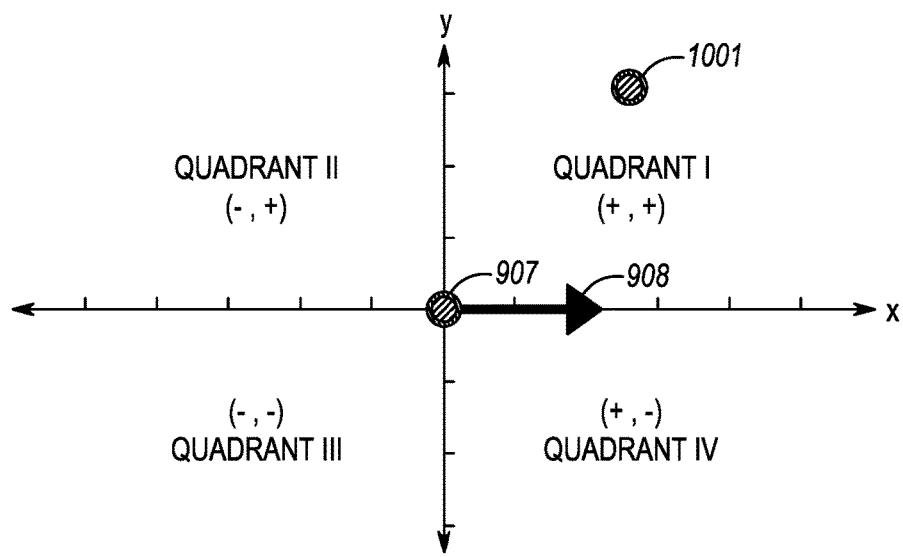
FIG. 10 illustrates changing a camera's pan/tilt/zoom based on vehicle direction of travel.

So, referring to FIG. 10, camera 1001 will have its images captured in a direction that captures images in quadrant I (e.g., substantially 45 degrees from the direction of motion 908) since camera 1001 lies in quadrant 1.

Figure 11:
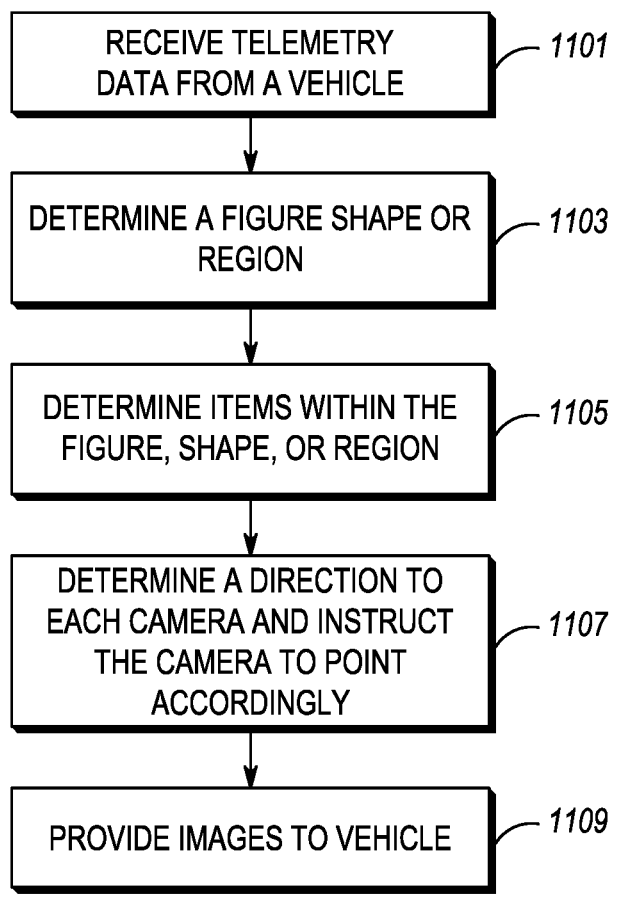
FIG. 11 is a flow chart showing operation of the dispatch center of FIG. 4.

FIG. 11 is a flow chart showing operation of dispatch center 101. More particularly, FIG. 11 shows a method for adjusting a PTZ of a camera and forwarding images from the camera. The logic flow begins at step 1001 where receiver 402 receives a speed and location of a vehicle. For instance, the received "speed" may comprise a vector that indicates direction. This is preferably received via receiver 402 receiving telemetry data from the vehicle via network 102. At step 1003 logic circuitry 403 determines a figure shape or region. It should be noted, that the figure, shape, or region has been described above based on the vehicle speed, however, in an alternate embodiment of the present invention, this geometric shape may remain constant and unchanging. When this is the case, only the cameras PTZ will be adjusted as discussed above. Using the location and/or heading of the vehicle, logic circuitry 403 then determines cameras within the figure, shape, or region (step 1005). This is preferably accomplished as described above by placing the figure, shape, or region over a geographic area. The figure, shape, or region may be aligned (e.g., have an axis aligned) with the heading. At step 1006 logic circuitry 403 determines a direction from the vehicle to each camera within the figure, shape or region, and instructs each camera to point accordingly. More particularly, PTZ data may be transmitted to each camera via logic circuitry 403 instructing the cameras to point in a certain direction (determined as described above). PTZ data may also be transmitted in a direct mode between equipment in the vehicle and cameras. Images on/from a camera within the figure, shape, or region is then provided to a vehicle (step 1007). More particularly, logic circuitry 403 instructs transmitter 401 to wirelessly transmit this images to a vehicle.

As discussed above, the figure, shape, or region has a shape that changes with vehicle speed. Additionally, the figure, shape or region begins at a distance from the vehicle, wherein the distance is based on the vehicle speed. The figure, shape, or region can also be based on a predetermined route to be taken by the vehicle.

In a particular embodiment, the predetermined figure, shape, or region extends an increasing distance from the route as the route's distance increases from the vehicle.

In the foregoing specification, specific embodiments have been described. However, one of ordinary skill in the art appreciates that various modifications and changes can be made without departing from the scope of the invention as set forth in the claims below. For example, while the above specification used a "vehicles" speed to modify a camera feed and a camera PTZ, one of ordinary skill in the art will recognize that a "person's" speed may be used in a similar manner. In fact, a speed of any object may be used to select a camera feed and modify a PTZ as described above. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for forwarding images from cameras, the method comprising the steps of:
   determining a direction of travel, a speed, and location of a vehicle;
   determining a figure, shape or region, wherein the figure, shape, or region exists in front of the vehicle, and wherein the vehicle does not exist within the figure, shape, or region;
   using the location of the vehicle to determine cameras within the figure, shape, or region;
   instructing the cameras within the figure, shape, or region to point in a direction that is determined based on the direction of travel of the vehicle;
   providing images on/from a camera within the figure, shape, or region;
   wherein the figure, shape, or region has a shape that changes with vehicle speed.

2. The method of claim 1 wherein the figure, shape, or region is a cone.

3. The method of claim 1 wherein the figure, shape, or region changes from a first shape to a second shape as the vehicle slows down.

4. The method of claim 1 wherein the step of determining the speed of the vehicle comprises the step of receiving vehicle telemetry data from the vehicle.

5. The method of claim 1 wherein the cameras exist outside the vehicle, and are not attached to the vehicle.

6. An apparatus comprising:
   a receiver outputting a direction of travel, a speed, and location of a vehicle;
   logic circuitry having the direction of travel, the speed, and the location as an input and outputting instructions to cameras within a figure, shape, or region, wherein the instructions are used to instruct the cameras within the figure, shape, or region to point in a direction that is determined based on the direction of travel of the vehicle, wherein the figure, shape, or region exists in front of the vehicle, and wherein the vehicle does not exist within the figure, shape, or region and wherein the figure, shape, or region has a shape that changes with vehicle speed.

7. The apparatus of claim 6 further comprising:
   a transmitter outputting images on/from a camera within the figure, shape, or region.

8. The apparatus of claim 6 wherein the cameras exist outside the vehicle, and are not attached to the vehicle.

* * * * *